United States Patent
Zunzer et al.

(10) Patent No.: US 11,654,758 B2
(45) Date of Patent: May 23, 2023

(54) SEALING PLUG PROFILE, ARRANGEMENT FOR A VEHICLE ROOF AND VEHICLE ROOF FOR A MOTOR VEHICLE

(71) Applicant: Webasto SE, Stockdorf (DE)

(72) Inventors: Andreas Josef Zunzer, Stockdorf (DE); Michael Böhm, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 242 days.

(21) Appl. No.: 17/025,420

(22) Filed: Sep. 18, 2020

(65) Prior Publication Data

US 2021/0101460 A1  Apr. 8, 2021

(30) Foreign Application Priority Data

Oct. 8, 2019  (DE) .......................... 102019126996.2

(51) Int. Cl.
  *B60J 10/82*  (2016.01)
  *B60J 10/32*  (2016.01)
  (Continued)

(52) U.S. Cl.
  CPC ............ *B60J 10/82* (2016.02); *B60J 10/248* (2016.02); *B60J 10/277* (2016.02); *B60J 10/32* (2016.02);
  (Continued)

(58) Field of Classification Search
  CPC ... B60J 10/16; B60J 10/32; B60J 10/33; B60J 10/82; B60J 10/246; B60J 10/248;
  (Continued)

(56) References Cited

U.S. PATENT DOCUMENTS 5,524,955 A * 6/1996 Brocke ............. B32B 17/10036
                                                      52/204.597
6,195,942 B1 * 3/2001 Sasaki ................... F25D 23/087
                                                      49/478.1
(Continued)

FOREIGN PATENT DOCUMENTS

DE   19719474 A1   10/1998
DE   10153135 A1    5/2003
(Continued)

OTHER PUBLICATIONS

Niemann, "Elastic Sealing Strip", Mar. 22, 1995, Publisher: European Patent Office, Edition: EP0644313A2 (Year: 1995).*
(Continued)

*Primary Examiner* — Dennis H Redder
*Assistant Examiner* — Joyce Eileen Hill
(74) *Attorney, Agent, or Firm* — Fitch, Even, Tabin & Flannery, LLP

(57) ABSTRACT

A sealing plug profile for fitting to an arrangement for a vehicle roof has a sealing element and a baseboard which is coupled to the sealing element and which extends along a longitudinal axis (LF). The baseboard may have a first base hollow space and a second base hollow space and a central web which separates the first and the second base hollow space from each other in a predetermined manner so that the first and the second base hollow space form two mutually separate hollow spaces within the baseboard, which are each delimited in a predetermined manner along the longitudinal axis (LF) by the central web and an edge of the baseboard.

8 Claims, 7 Drawing Sheets

(51) Int. Cl.
    *B60J 10/248*     (2016.01)
    *B60J 10/277*     (2016.01)
    *B60J 7/043*     (2006.01)
    *E06B 7/23*     (2006.01)

(52) U.S. Cl.
    CPC ............. *B60J 7/043* (2013.01); *E06B 7/2305* (2013.01); *E06B 7/2309* (2013.01)

(58) Field of Classification Search
    CPC ...... B60J 10/277; B60J 10/2335; B60J 7/043; B60R 13/06; F16J 15/027; F16J 15/12; F16J 15/122; E06B 7/2305; E06B 7/2309; E06B 7/2314
    USPC ........... 296/216.07, 216.09; 49/489.1, 498.1, 49/490.1
    See application file for complete search history.

(56) References Cited

U.S. PATENT DOCUMENTS

| | | | | |
|---|---|---|---|---|
| 6,832,451 | B2 * | 12/2004 | Yamashita | B60J 10/24 49/489.1 |
| 7,628,448 | B2 * | 12/2009 | Katayama | B60J 10/24 296/213 |
| 9,950,599 | B2 * | 4/2018 | Zunzer | B60J 7/022 |
| 2015/0130227 | A1 * | 5/2015 | Dietl | B60J 7/0046 296/217 |

FOREIGN PATENT DOCUMENTS

| | | | |
|---|---|---|---|
| DE | 102006038000 B3 | 4/2008 | |
| DE | 202008005047 U1 | 6/2008 | |
| DE | 102009004873 A1 | 7/2010 | |
| DE | 102009009283 A1 * | 8/2010 | ............ B60J 10/16 |
| DE | 102015016226 A1 | 6/2017 | |
| EP | 644313 A2 * | 3/1995 | ........... E06B 7/2305 |

OTHER PUBLICATIONS

Bott et al., "Roof e.g. sliding roof, for vehicle i.e.seal fastened to roof part or another roof part and comprising ends fastened with one of roof parts and connected with one another, where seal is manufactured as single-piece", Aug. 5, 2010, German Patent Office, Edition: DE102009009283A1 (Year: 2010).*

* cited by examiner

SEALING PLUG PROFILE, ARRANGEMENT FOR A VEHICLE ROOF AND VEHICLE ROOF FOR A MOTOR VEHICLE

CROSS-REFERENCE TO RELATED APPLICATION

This application claims priority from German Patent Application Number DE 10 2019 126 996.2, filed Oct. 8, 2019, which is hereby incorporated herein by reference in its entirety for all purposes.

FIELD

The invention relates to a sealing plug profile for fitting to an arrangement for a vehicle roof. The invention further relates to an arrangement for a vehicle roof and a vehicle roof for a motor vehicle.

BACKGROUND

Some motor vehicles have cover or roof systems which are integrated in the vehicle roof and which enable viewing through the vehicle roof. In this instance, it is necessary to seal intermediate spaces between the cover system and a fixed roof membrane against environmental influences, in particular against the penetration of water. To this end, there are used sealing elements which are, for example, adhesively bonded, screwed or clamped to components of the cover system. Accordingly, it is a challenge to provide a reliable sealing. One possibility for sealing is described in the document DE 10 2006 038 000 B3.

SUMMARY

An objective forming the basis of the invention is to provide a sealing plug profile for fitting to an arrangement for a vehicle roof which enables in a simple and cost-effective manner a stable and secure retention on the arrangement and which contributes to reliable sealing of a corresponding vehicle roof.

The object is achieved by a sealing plug profile having the features of the independent patent claim.

Advantageous embodiments are set out in the dependent patent claims.

A sealing plug profile according to the invention for fitting to an arrangement for a vehicle roof has a sealing element and a baseboard which is coupled to the sealing element and which extends longitudinally along a longitudinal axis. The baseboard comprises a first base hollow space and a second base hollow space and a central web which separates the first and the second base hollow space from each other in a predetermined manner so that the first and the second base hollow space form two mutually separate hollow spaces within the baseboard which are each delimited in a predetermined manner along the longitudinal axis by the central web and an edge of the baseboard.

Using the sealing plug profile described, a sealing with a plug-in base which has a force-transmitting central web and which contributes to a simplified assembly and enables reduced assembly time can be produced.

It is recognised in connection with the present invention that with fitted seals it is often difficult within automotive structural space provisions to provide sealing clamping bases fitting in a secure and stable manner. For example, the sealing plug profile may be configured to form a secure and reliable securing of a seal to a component which is foam-encapsulated with polyurethane. It is consequently not necessary to adhesively bond a seal, as generally used, for example, in steel frames. The sealing plug profile forms a cost-effective and simple-to-assemble sealing means which may in particular be constructed as an alternately inserted profile. The sealing plug profile with the described structure is additionally adapted to structural space relationships of predetermined installation situations.

According to a development of the sealing plug profile, the first and the second base hollow space are delimited in such a predetermined manner that with respect to a cross-section transverse relative to the longitudinal axis they each have a wider and a narrower hollow space portion, wherein the wider hollow space portion faces the sealing element in each case. In this manner, an advantageous stability of the plug-in base of the sealing plug profile can be configured.

According to another development of the sealing plug profile, the central web is constructed in a strip-like manner and has a main extent plane which is orientated parallel with a horizontal plane with respect to a correctly arranged state of the sealing plug profile on the arrangement in a manner integrated in the vehicle roof. In this context, it is not necessary for the described main extent plane of the sealing plug profile to be orientated precisely and/or completely parallel with a horizontal plane. In other words, the central web as a strip-like or band-like element may also be described as substantially parallel with the vehicle roof, wherein a vehicle roof generally also has a degree of curvature.

The sealing plug profile forms an elongate bar with a correspondingly elongate sealing element and a plug-in base, within which the two separate base hollow spaces are formed and are separated by the central web as a partition wall. With respect to a cross-section transverse to the longitudinal axis of the sealing plug profile and an inserted and operationally ready state, the central web consequently extends between the sealing element and the arrangement of the vehicle roof and contributes to a particularly stable retention and reliable sealing.

The sealing plug profile is used in particular for sealing in the dry region. The plug-in base or the baseboard is, for example, formed with alternating punched-out portions and in a manner adapted to a plug-in region on a cover frame. The plug-in base is used for fixing. In comparison with an adhesive tape solution with a double-sided special adhesive tape, the described sealing plug profile affords in particular cost advantages and requires during application no pretreatments, as, for example, in the case of adhesive bonding. The sealing plug profile can be inserted in a simple manner and additionally affords a simple and non-complex capacity for disassembly in the event of mounting or servicing. The baseboard can also be referred to as a plug-in base, as a sealing base or as a fitting or insertion region of the sealing plug profile.

According to another development of the sealing plug profile, the baseboard has chamfered faces so that the baseboard tapers with respect to a cross-section transverse relative to the longitudinal axis of the sealing plug profile in a direction which faces away from the sealing element. Such a wedge-like or frustoconical baseboard enables particularly simple and directed insertion of the sealing plug profile in a predetermined hollow space of the arrangement for the vehicle roof.

According to another development of the sealing plug profile, the baseboard has with respect to a cross-section transverse relative to the longitudinal axis a first portion which faces the sealing element, a second portion which faces away from the sealing element, and a central portion which is formed between the first and the second portion, wherein the baseboard has with respect to the cross-section transverse relative to the longitudinal axis in the region of the central portion a larger dimension than in the region of the first portion. In this manner, it is possible to produce a rear-engagement structure for the baseboard which with respect to the described cross-section has narrower outer regions and a wider central region. When the sealing plug profile is inserted, the wider central portion can be pressed through a provided opening in the arrangement which can preferably resiliently expand and contracts again after pressing through the central portion so that the plug-in base or the baseboard is securely retained.

According to another development of the sealing plug profile, the baseboard has with respect to a cross-section transverse relative to the longitudinal axis at the edge engagement elements which are configured to configure a friction-locked coupling in conjunction with a retention element. Such engagement elements may in particular be constructed in the form of edge projections which, for example, are provided in the above-described central portion and after insertion of the sealing plug profile enable engagement of the baseboard in the hollow space or on the retention element. The retention element may, for example, be configured as a metal rail or a steel strip of the cover frame and may ensure secure and stable engagement of the baseboard. Alternatively or additionally, a positive-locking coupling can be configured by means of the retention element.

According to another development of the sealing plug profile, the baseboard has with respect to a cross-section transverse relative to the longitudinal axis at an end which faces the sealing element wing elements which are configured to configure a friction-locked coupling in conjunction with a retention element. The wing elements may in particular in combination with the above-described engagement elements and/or the wider central portion contribute to a particularly reliable and stable retention of the sealing plug profile on the arrangement.

For example, the retention element is provided in the form of a steel rail or sheet metal wall of the cover frame so that the wing elements at one side contact the steel rail and the engagement elements at the opposite side engage the steel rail. The wing elements are, for example, constructed to be bent and apply as a result of a resilient deformation a force which presses the baseboard away from the steel rail so that the engagement elements which engage behind are pulled in a direction towards the steel rail. Consequently, a stable and secure retention of the sealing plug profile can be configured in a simple and reliable manner.

The baseboard with the two hollow chambers or base hollow spaces and the central web and elements which may be present, such as the wing elements and engagement elements, may in particular be produced in an integral manner from plastics material within the scope of an injection-moulding process. For example, the baseboard with the base hollow spaces may be produced as an extrusion profile. Alternatively, the baseboard is constructed in several parts.

Furthermore, the sealing plug profile may be developed in such a manner that the sealing element has a sealing hollow space. In this manner, an advantageous deformation property of the sealing element may be provided and can be adapted to locally predetermined surfaces. Consequently, a contribution can be made to reliable sealing.

As a result of the described structure of the sealing plug profile, component and application costs can be kept low. The sealing plug profile takes into account with the baseboard confined structural space relationships and installation situations and in particular the z-structural space situation for the insertion portion of the sealing base, which is based on a vertical with respect to a motor vehicle which is ready for operation.

It has been recognised in connection with the present invention that a virtual non-deformability of frame slots in the arrangement for the vehicle roof during assembly of a sealing plug profile and the relatively thin sheet metal thickness as a clamping region with correspondingly little geometric resilience of the corresponding sealing region also requires, for example, a glass cover construction, wherein a simple capacity for assembly is desirable so that the required assembly time and physical strain on workers are kept at a low level.

Using the sealing plug profile described, walls involved can be made thinner and in particular the embodiment with two separate hollow chambers and the central web for force transmission enable the assembly forces and the assembly time to be reduced in a relevant manner. With the force-transmitting central web and the two separate base hollow spaces, the sealing plug profile can be assembled in a substantially more simple, robust and rapid manner. The central web which has been selectively introduced or formed particularly ensures an advantageous force transmission when the sealing plug profile is inserted into the retention member which is provided for this purpose and which is constructed, for example, as a cover frame and/or foam encapsulation of an arrangement having a cover for a vehicle roof.

An arrangement according to the invention for a vehicle roof has a cover which has a cover element and a cover frame and which is coupled to the cover element and comprises one or more hollow spaces. The arrangement further has an embodiment of the above-described sealing plug profile, which is coupled to the cover. In this instance, the baseboard extends into the hollow space of the cover frame so that the arrangement is configured, in a state coupled to the vehicle roof, to seal an intermediate space between a fixed roof membrane of the vehicle roof and the cover.

A vehicle roof according to the invention for a motor vehicle comprises a roof body having a fixed roof membrane which delimits an opening in the vehicle roof in a predetermined manner and an embodiment of the above-described arrangement which is coupled to the roof body by means of a cover frame so that the sealing plug profile seals the intermediate space between the roof membrane of the vehicle roof and the cover. The cover frame may also be described as a roof frame and may form a component of the vehicle roof. Alternatively, the cover frame may form a component of the arrangement. In this instance, the cover frame forms an interface between the arrangement and the vehicle roof.

As a result of the fact that the arrangement and the vehicle roof comprise an embodiment of the above-described sealing plug profile, the above-described features and properties of the sealing plug profile are also disclosed for the arrangement and the vehicle roof, and vice versa.

BRIEF DESCRIPTIONS OF THE DRAWINGS

Embodiments of the invention are explained in greater detail below with reference to the schematic drawings, in which.

DETAILED DESCRIPTION

Figure 1:
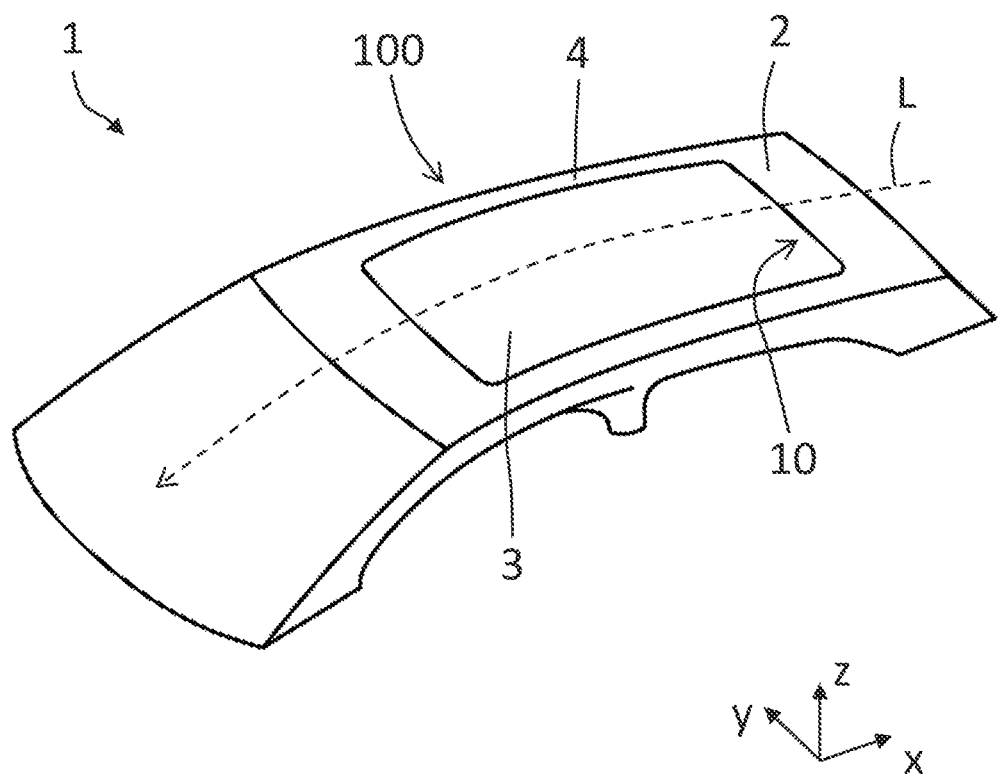
FIG. 1 is a perspective view of a motor vehicle having a vehicle roof.

Elements with the same construction or function are given the same reference numerals in all the Figures. For reasons of clarity, where applicable not all illustrated elements in all the Figures are indicated with reference numerals.

FIG. 1 is a schematic, perspective view of a vehicle roof 2 of a motor vehicle 1 which has a cover 3. The cover 3 is, for example, a fixed glass element which cannot be moved relative to the vehicle roof 2. Alternatively, the cover 3 can be moved relative to the vehicle roof 2 in order to selectively release and close an opening in the vehicle roof 2. The cover 3 has a cover frame 5 and a cover element 6, for example, in the form of a glass pane, which is coupled to the cover element 6 and which has one or more hollow spaces 9, for example, in the form of alternating slots. The cover frame 5 forms a connection interface between the cover element 6 and a fixed roof membrane 4 of the vehicle roof 2. The cover 3 forms a component of an arrangement 100.

Figure 5:
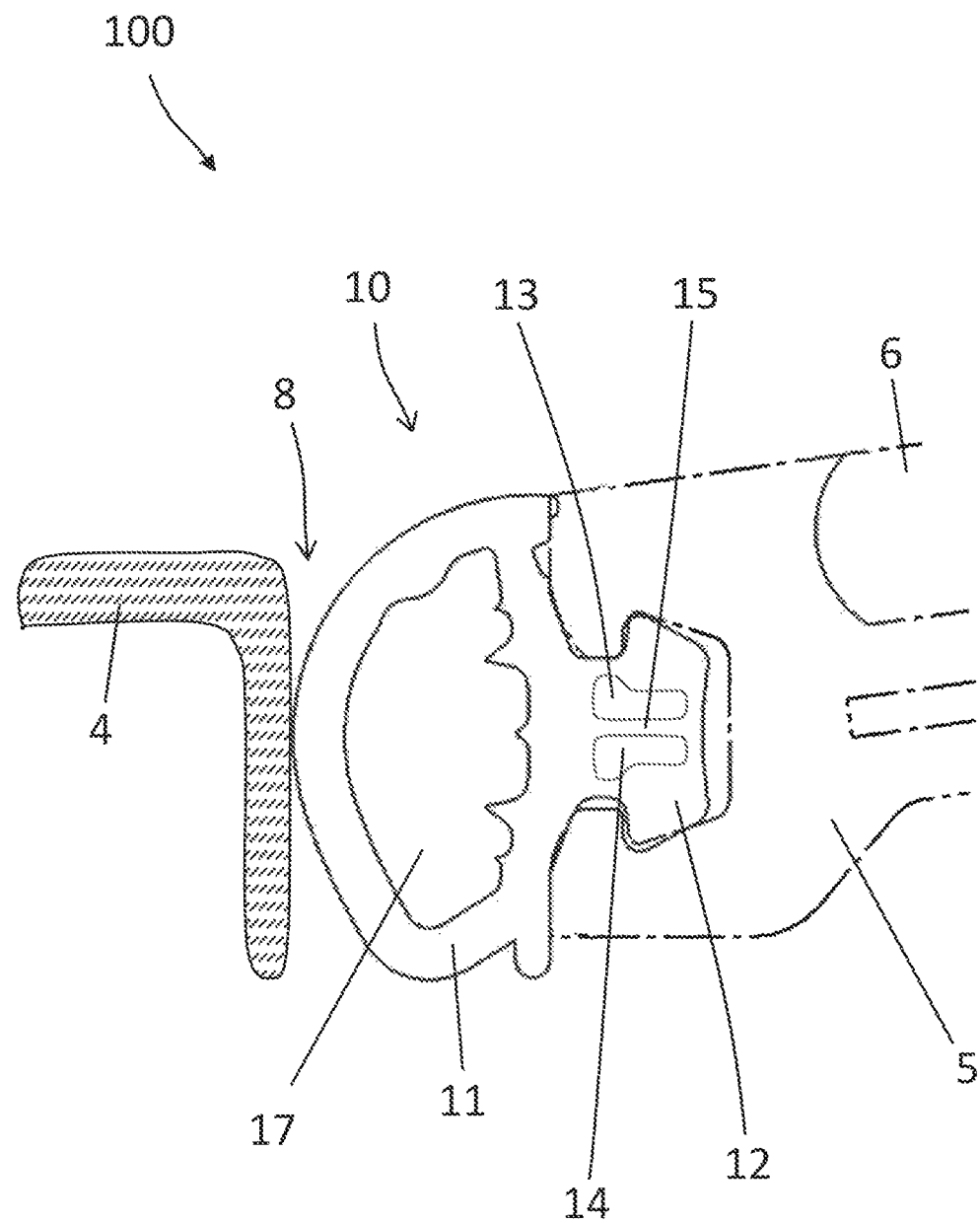

A sealing plug profile 10 forms another component of the arrangement 100 and is coupled to the cover frame 5 by means of a plug-in base or a baseboard 12 and is configured to seal an intermediate space 8 between the cover 3 and the fixed roof membrane 4 of the vehicle roof 2 against the penetration of water (see FIG. 5). As will be explained below with reference to FIGS. 2 to 8, the sealing plug profile 10 enables in a simple and cost-effective manner stable and secure retention on the cover frame 5 and contributes to reliable sealing of the vehicle roof 2.

Figure 2:
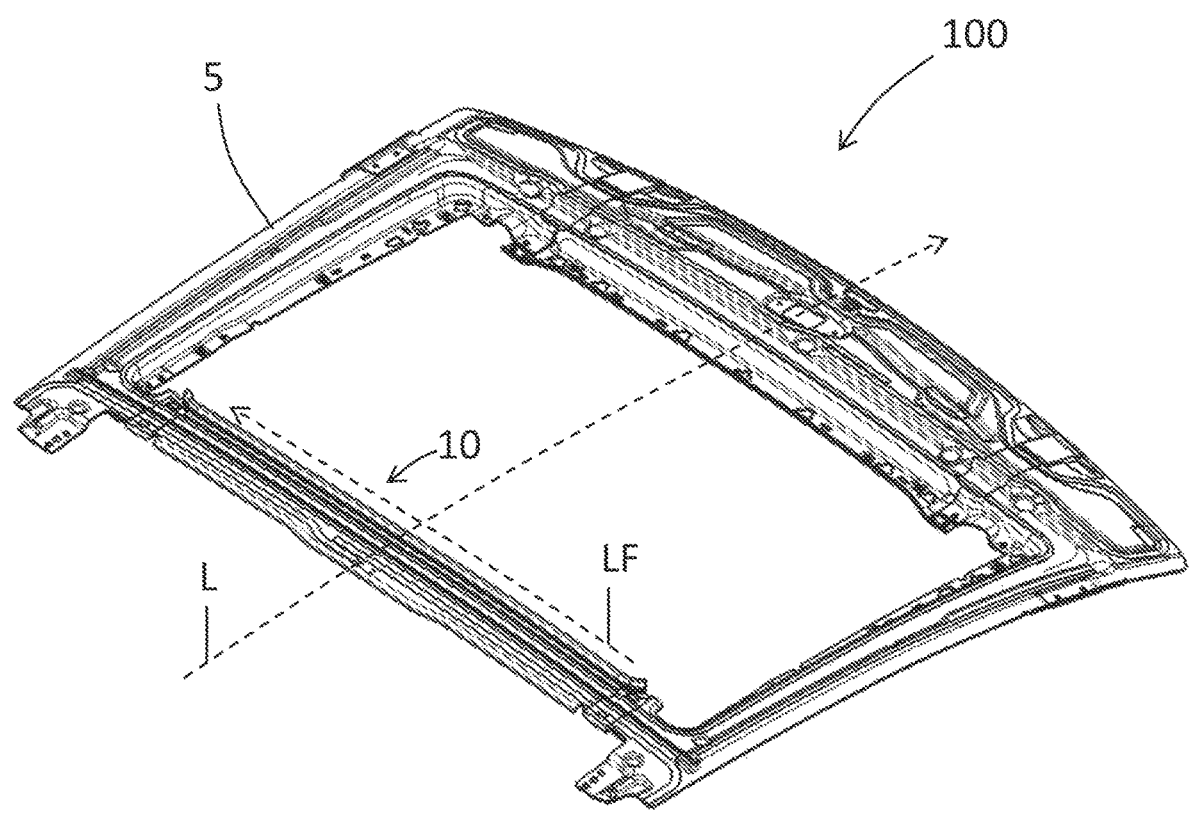
FIGS. 2-5 are different views of an embodiment of an arrangement with a sealing plug profile for a vehicle roof.

FIGS. 2 to 5 show an embodiment of the arrangement 100 with the sealing plug profile 10 as different views. FIG. 2 illustrates a cover frame 5 which forms a connection interface for the arrangement 100 on the vehicle roof 2. Furthermore, the sealing plug profile 10 is illustrates and extends in the form of a plug strip along a longitudinal axis LF which is orientated transversely relative to a longitudinal axis L of the vehicle roof 2 or the motor vehicle 1. The cover frame 5 is, for example, configured as a steel frame, to which the sealing plug profile 10 is fitted alternately in the rear region.

The sealing plug profile 10 is configured for fitting to the arrangement 100 or for inserting into a hollow space 9 of the cover frame 5. The sealing plug profile 10 has a sealing element 11 and the baseboard 12 coupled to the sealing element 11, which extend along a longitudinal axis LF of the sealing plug profile 10. The baseboard 12 comprises a first base hollow space 13 and a second base hollow space 14 and a central web 15 which separates the first and the second base hollow space 13, 14 from each other in a predetermined manner so that the first and the second base hollow space 13, 14 form two mutually separate hollow chambers within the baseboard 12. The base hollow spaces 13, 14 are each delimited in a predetermined manner along the longitudinal axis LF by the central web 15 and an edge 19 of the baseboard 12 (see FIGS. 4 and 5).

Figure 3:
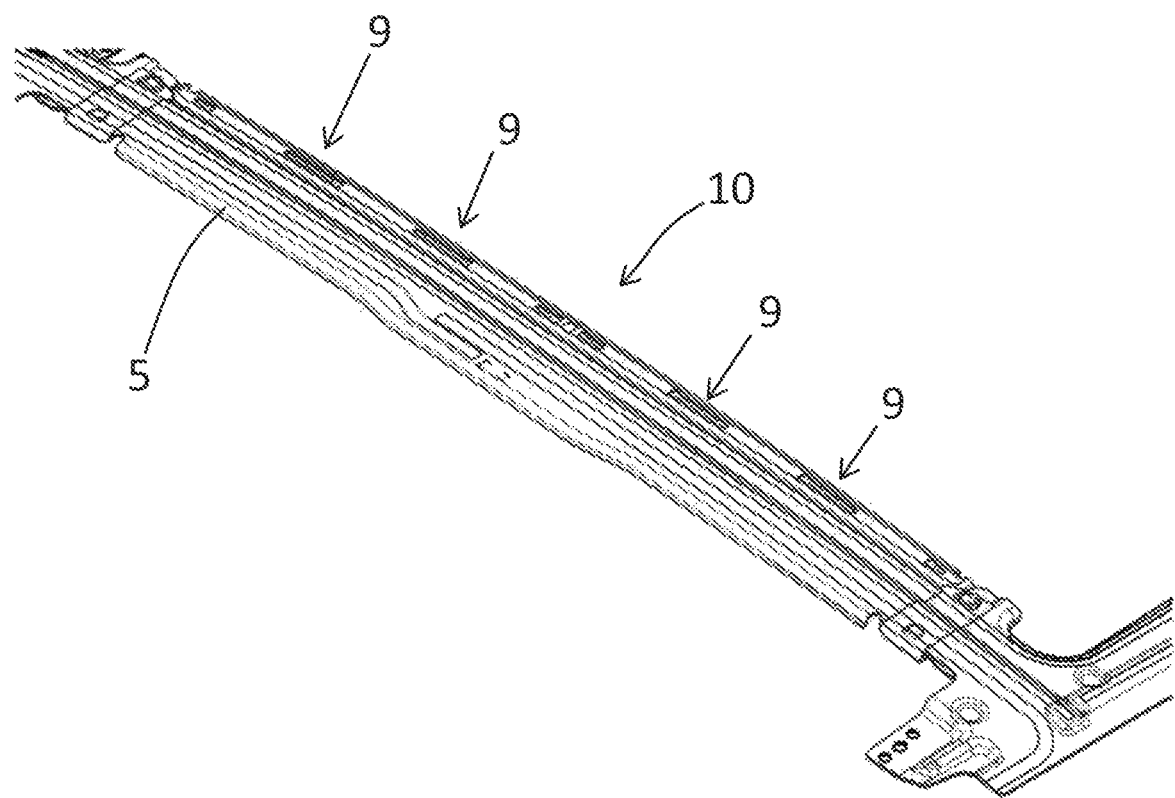
Figure 4:
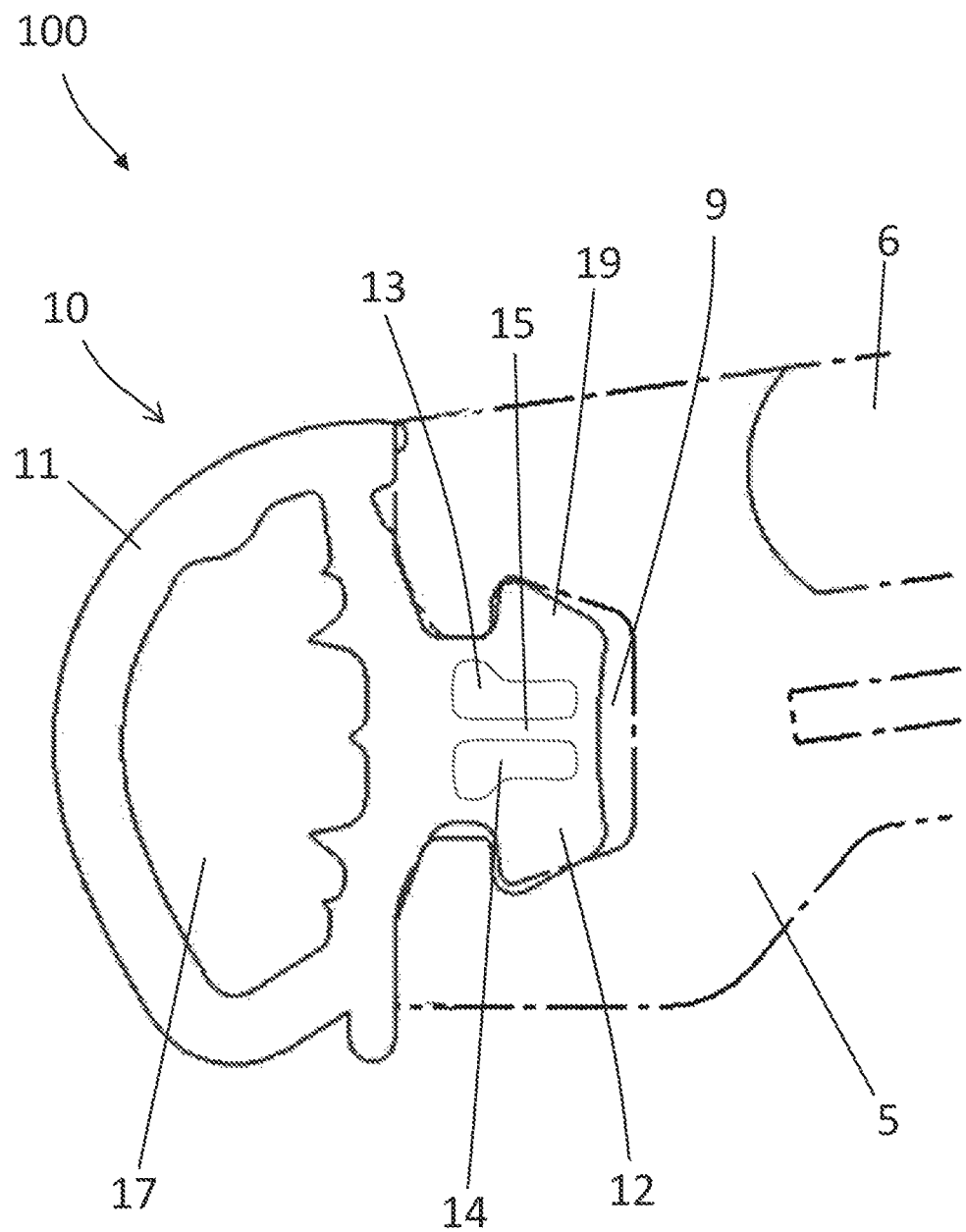

FIG. 3 is an enlarged view of the rear region of the cover frame 5, in which alternating slots are predetermined in the steel frame and enable an inserted sealing assembly of the sealing plug profile 10. Alternatively or additionally, an insertion of the sealing plug profile 10 can also be carried out in one or more hollow spaces of a foam encapsulation.

Figure 6:
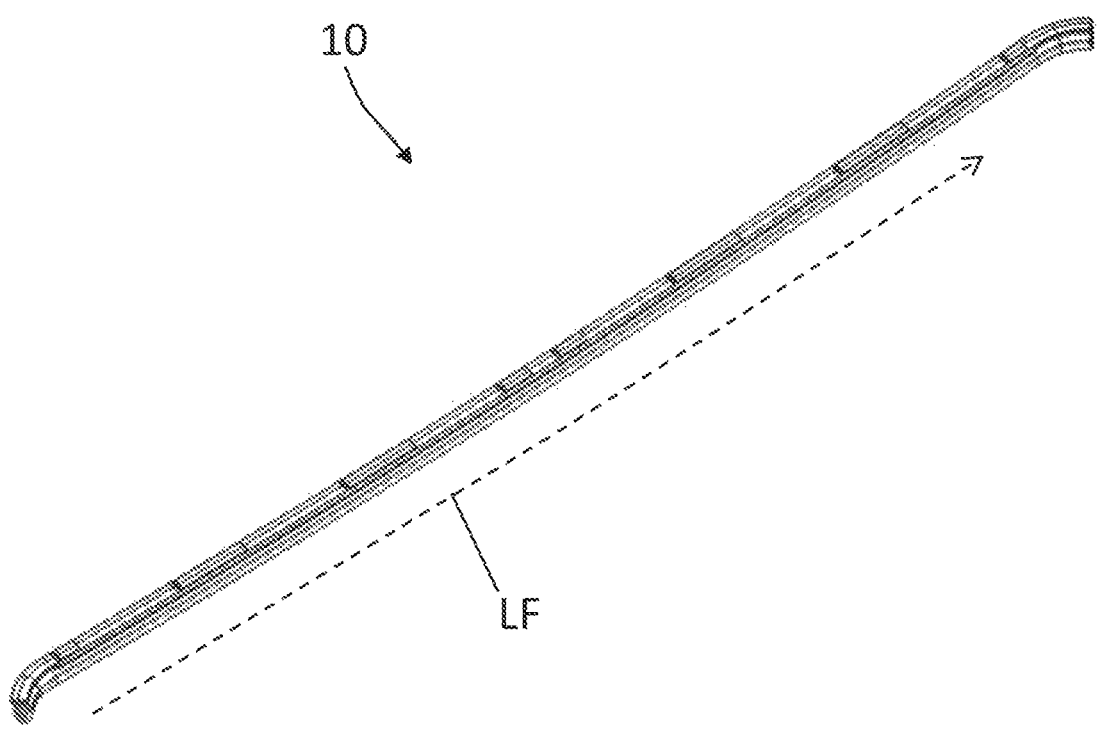
FIGS. 6-8 are different views of an embodiment of the sealing plug profile for fitting to the arrangement for the vehicle roof.

FIG. 6 is a perspective illustration of the sealing plug profile 10. There is indicated an alternately punched-out sealing base or baseboard 12 of the sealing plug profile 10. The corresponding steel frame has alternating punched-out portions which provide a simple-to-produce coupling possibility. The sealing base 12 and the steel frame 5 consequently form complementarily mutually engaging components which form a reliable connection.

Figure 7:
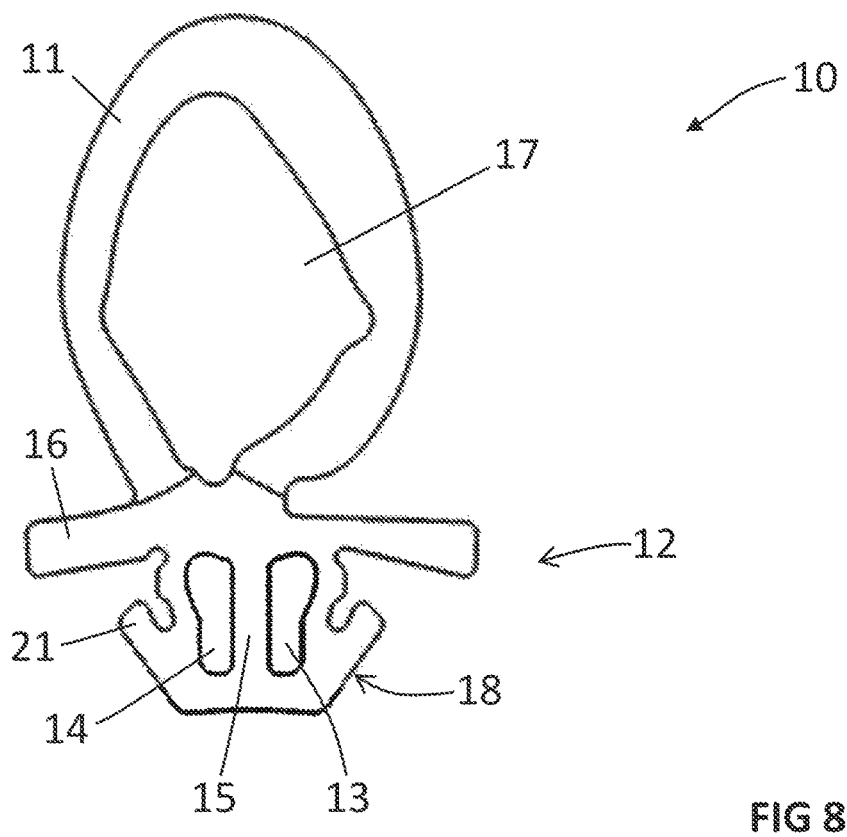
Figure 8:
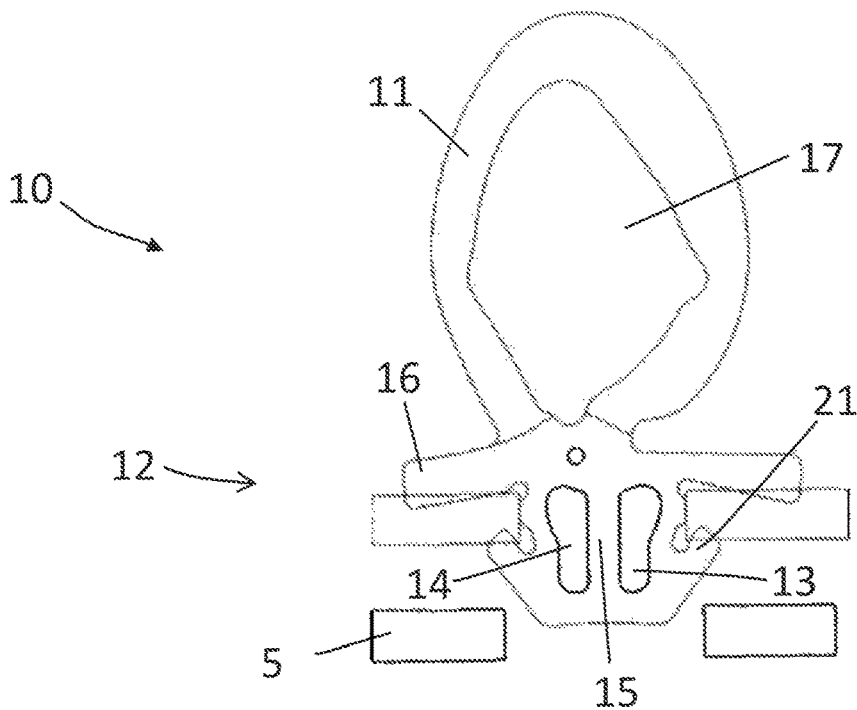

FIGS. 7 and 8 shows cross-sections of the sealing plug profile 10 transverse relative to the longitudinal axis LF. The sealing element 11 has a sealing hollow space 17 which provides deformability of the sealing element 11 and which enables local adaptation of the sealing element 11 to surfaces to be contacted.

The central web 15 is configured in a strip-like, band-like or plate-like manner and forms an internal partition wall between the base hollow spaces 13 and 14. The sealing plug profile 10 further has wing elements 16 and engagement elements 21 which cooperate in a state arranged on the cover frame 5 and form a particularly secure and stable retention. In addition, the baseboard 12 has chamfered side faces 18 which contribute to a simple and directed assembly. The plug-in base or the baseboard 12 is inserted with the narrower end at the front into a provided slot or a provided hollow space 9 in the cover frame 9 until the engagement elements 21 engage and lock to a sufficient depth in the hollow space 9 (see FIG. 8). The wing elements 16 are used for stable retention and precise positioning of the sealing plug profile 10 on the cover frame 5.

Using the described sealing plug profile 10, a seal with a plug-in base which has a force-transmitting central web 15, contributes to a simplified assembly and enables a reduced assembly time can be produced.

The invention claimed is:

1. Sealing plug profile for fitting to an arrangement for a vehicle roof, having: a sealing element, and a baseboard which is coupled to the sealing element and which extends longitudinally along a longitudinal axis, wherein the baseboard comprises a first base hollow space and a second base hollow space and a central web which separates the first and the second base hollow space from each other in a predetermined manner so that the first and the second base hollow space form two mutually separate hollow spaces within the baseboard which are each delimited in a predetermined manner along the longitudinal axis by the central web and an edge of the baseboard;

wherein the first and the second base hollow space are delimited in such a predetermined manner that with respect to a cross-section transverse relative to the longitudinal axis they each have a wider and a narrower hollow space portion, wherein the wider hollow space portion faces the sealing element in each case;

wherein the baseboard has with respect to a cross-section transverse relative to the longitudinal axis at an end which faces the sealing element downwardly extended wing elements which are configured to configure a friction-locked coupling in conjunction with a retention element; and wherein the wing elements form the widest portion of the sealing element in relation to a cross-section transverse relative to the longitudinal axis.

2. Sealing plug profile according to claim 1, wherein the central web is constructed in a strip-like manner and has a main extent plane which is orientated parallel with a horizontal plane with respect to a correctly arranged state of the sealing plug profile on the arrangement on the vehicle roof.

3. Sealing plug profile according to claim 1, wherein the baseboard has chamfered faces so that the baseboard tapers with respect to a cross-section transverse relative to the longitudinal axis in a direction which faces away from the sealing element.

4. Sealing plug profile according to claim 1, wherein the baseboard has with respect to a cross-section transverse relative to the longitudinal axis a first portion which faces the sealing element, a second portion which faces away from the sealing element, and a central portion which is formed between the first and the second portion, wherein the baseboard has in the region of the central portion a larger dimension than in the region of the first portion.

5. Sealing plug profile according to claim 1, wherein the baseboard has with respect to a cross-section transverse relative to the longitudinal axis at the edge engagement elements which are configured to configure a friction-locked coupling in conjunction with a retention element.

6. Sealing plug profile according to claim 1, wherein the sealing element has a sealing hollow space.

7. Arrangement for a vehicle roof, having: a cover which has a cover element and a cover frame and which is coupled to the cover element and which has one or more hollow spaces, and a sealing plug profile according to claim 1, which extends by means of the baseboard into the hollow space and which is coupled to the cover frame so that the arrangement is configured to be coupled to the vehicle roof and to seal an intermediate space between a fixed roof membrane of the vehicle roof and the cover.

8. Vehicle roof for a motor vehicle, comprising: a roof body having a fixed roof membrane, which delimits an opening in the vehicle roof in a predetermined manner, and an arrangement according to claim 7, which is coupled to the roof body by means of the roof frame so that the sealing plug profile seals the intermediate space between the roof membrane of the vehicle roof and the cover.

* * * * *